United States Patent [19]

Mitarai et al.

[11] Patent Number: 4,997,801
[45] Date of Patent: * Mar. 5, 1991

[54] CATALYST FOR HYDROTREATING HYDROCARBONS

[75] Inventors: Yukuaki Mitarai, Kamagaya; Naoto Kinbara, Ichikawa; Yasuhito Takahashi, Narashino; Tomio Kawaguchi, Funabashi; Shigeru Sakai, Ichikawa, all of Japan

[73] Assignee: Sumitomo Metal Mining Company Limited, Tokyo, Japan

[*] Notice: The portion of the term of this patent subsequent to Jul. 4, 2006 has been disclaimed.

[21] Appl. No.: 340,518

[22] Filed: Apr. 19, 1989

[30] Foreign Application Priority Data

Apr. 21, 1988 [JP] Japan ................................. 63-98777

[51] Int. Cl.⁵ .................... B01J 31/34; B01J 31/28; B01J 27/049; B01J 27/188
[52] U.S. Cl. .................... 502/168; 208/216 R; 502/210; 502/211; 502/219; 502/220; 502/221
[58] Field of Search ................ 502/168, 210, 211, 219, 502/220, 221

[56] References Cited

U.S. PATENT DOCUMENTS

| 3,477,963 | 11/1969 | van Vehrooy | 502/220 |
| 3,972,829 | 8/1976 | Michacko | 502/168 |
| 3,998,759 | 12/1976 | Hoekstra | 502/332 |
| 4,530,917 | 7/1985 | Berrebi | 502/168 |
| 4,588,706 | 5/1986 | Kukes et al. | 520/210 |
| 4,636,487 | 1/1987 | Parrot et al. | 502/168 |
| 4,719,195 | 1/1988 | Toulhoat et al. | 520/220 |
| 4,725,569 | 2/1988 | Tuszynski et al. | 502/168 |
| 4,845,068 | 7/1989 | Takahashi et al. | 502/168 |

*Primary Examiner*—Paul E. Konopka
*Attorney, Agent, or Firm*—Watson, Cole, Grindle & Watson

[57] ABSTRACT

There is disclosed a catalyst which hydrotreats hydrocarbons without need of presulfiding. The catalyst comprises a carrier of an inorganic oxide containing a sulfurizing agent and a water-soluble compound of two metals one of which belongs to the Group VI of the Periodic Table, while the other belongs to the Group VIII. The carrier has pores in which a precursor of a sulfide is formed. The coordination number of the closest Group VI metal found from the radial distribution function around the Group VI metal is less than 0.25. The function is obtained from the Fourier transform of the extended x-ray absorption fine structure of the precursor.

6 Claims, 1 Drawing Sheet

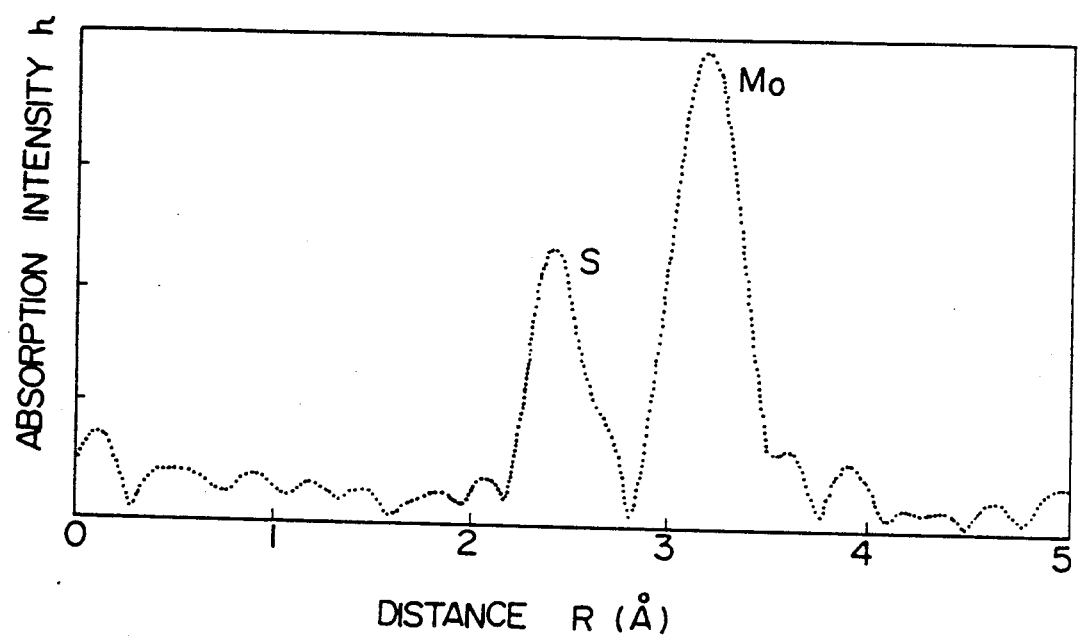

CATALYST FOR HYDROTREATING HYDROCARBONS

FIELD OF THE INVENTION

The present invention relates to a catalyst which hydrotreats hydrocarbons without the need to be activated.

BACKGROUND OF THE INVENTION

In the hydrotreating process, hydrocarbon oils are hydrogenated, desulfurized, denitrified, cracked, or otherwise treated in the presence of hydrogen. For such a process, a catalyst is used in a carrier made from an inorganic oxide, such as alumina, silica alumina, or titania. The catalyst contains at least one kind of metal selected from Groups VI and VIII of the Periodic Table to promote hydrotreating. Mo and W are frequently used as Group VI metals. Co and Ni are often employed as Group VIII metals.

Usually, these metals are contained in the form of oxides. Since they are not active as they are, it is necessary to transform the oxides into sulfides to activate them before they are used in a hydrotreating process, i.e., presulfiding is necessitated.

Generally, presulfiding is effected by passing a sulfurizing agent through a catalyst bed together with hydrogen after the catalyst is loaded into the reactor in which hydrocarbon oil is to be hydrotreated. The operating conditions of the preliminary sulfurization differ depending on the hydrotreating process and also on the sulfurizing agent used. Where hydrogen sulfide is used, about 0.5 to 5% by volume of hydrogen sulfide is contained in hydrogen, and 1000 to 3000 l (at normal temperature and normal pressure) of this compound is employed per liter of the catalyst. The temperature is in excess of 180° C. Normally, the temperature is higher than 250° C. Where carbon disulfide, normal butyl mercaptan, dimethyl sulfide, dimethyl disulfide, or other similar material is utilized, it is diluted with a light hydrocarbon oil. The conditions are as follows. The temperature is 250° to 350° C. The pressure is 20 to 100 Kg/cm$^2$. The liquid space velocity is 0.5 to 2 hr$^{-1}$. The ratio of hydrogen to oil is 200 to 1000Nl/l. After the presulfiding process is carried out in this way, the feedstock to be treated is introduced, and the hydrotreating process is initiated.

The aforementioned presulfiding process determines whether the subsequent hydrotreating process succeeds and, therefore, appropriate selection of the used materials and careful operations are needed. As an example, when a diluting agent is used, if it contains olefins, then the resulting polymers poisons the catalyst. For this reason, it is necessary to employ a hydrocarbon oil containing no olefins. Where the viscosity is high, the wettability on the surface of the catalyst is low and so heavy oils are inappropriate. Consequently, the use of light distillates is required. This results in an increase in cost. If a metal catalyst reacts with hydrogen at a high temperature and is reduced, then it is passivated. To prevent this undesirable phenomenon, a large amount of sulfurizing agent must be used. Also, the ratio of hydrogen to the sulfurizing agent must be maintained at appropriate values. Usually, the presulfiding of this kind is carried out for several days. Because this operation is temporary, it is rarely automated. Thus, unusally complex operations are required. This imposes a great burden on the operator. Hence, the omission of the presulfiding step or, at least, a decrease in the complexity of the operations has been required.

SUMMARY OF THE INVENTION

It is an object of the present invention to provide a novel catalyst which hydrotreats hydrocarbons without requiring the aforementioned presulfiding.

The above object is achieved in accordance with the teachings of the invention by a catalyst comprising a carrier of an inorganic oxide, the carrier containing a water-soluble compound of a sulfurizing agent and two metals. The compound can further contain phosphorus. The two metals belong to the Groups VI and VIII, respectively, of the Periodic Table. The carrier has pores in which a precursor of a sulfide is formed. The coordination number of the closest Group VI metal which can be found from the radial distribution function around the Group VI metal is less than 0.25 before use. The function is determined from the Fourier transform of the extended x-ray fine structure of the precursor.

As is well known in the art, examples of carriers of inorganic oxides include alumina, silica alumina, and titania. Especially, alumina and silica alumina are typical examples.

It is also known that the contained active metal belonging to the Group VI of the Periodic Table is preferably Mo or W or both. The metal belonging to the Group VIII is preferably Co or Ni or both. Either the Group VI metal or the Group VIII metal is used alone, or their mixture is employed. If necessary, phosphorus is added.

Phosphorus is also a known active substance and useful to the novel catalyst. Phosphoric acid is adequate as an impregnant and can be a water solution independent of the above-described water-soluble compound, for impregnation. Alternatively, the catalyst is impregnated with an impregnant containing the water-soluble compound as well as phosphoric acid. In the latter case, the viscosity of the liquid increases as the phosphoric acid content increases, and it becomes more difficult to impregnate the catalyst with the impregnant. Therefore, in this method, the upper limit of the amount of P$_2$O$_5$ contained in the catalyst is approximately 8% by weight.

The carrier is impregnated with any of these water-soluble compounds. In accordance with the invention, a sulfurizing agent is added as an impregnant.

Examples of the sulfurizing agent include mercaptocarboxylic acids, such as mercaptoacetic acid and β-mercaptopropionic acid, their salts, bivalent mercaptans, such as ethane dithiol, and 1,4-butanedithiol, amino-replaced mercaptans, such as 2-aminoethanethiol and 4-amino thiophenol, thio acids, such as thioacetic acid and thiobenzoic acid, mercaptocarboxylic acid esters, such as mercaptomethyl acetate, mercaptoethylhexyl acetate, and mercaptopropiolic methyl. The carrier can be impregnated with water solution of any of these sulfurizing agents. The amount of the contained sulfurizing agent is preferably one to three times the amount of sulfur in equivalent weight, the sulfur being necessary for a metal belonging to the Group VI of the Periodic Table and for a metal belonging to the Group VIII to form sulfides, such as M$_o$S$_2$, WS$_2$, CoS, and NiS, which show high activity in a hydrotreating process. If the contained amount is less than this range, the activity is low. If the amount is in excess of this range, the activity is not increased so much and, therefore, it is uneconomical.

The carrier can be impregnated with the sulfurizing agent either after the carrier is impregnated with the active metal or simultaneously with the latter impregnation.

The carrier is impregnated with an active metal. Alternatively, the carrier is impregnated with an active metal, phosphorus, and a sulfurizing agent as mentioned already. After the impregnated carrier dries, a precursor of a sulfide is formed in the pores. During the hydrotreating process, the precursor gradually crystallizes.

The process of the crystallization can be traced by investigating the extended x-ray absorption fine structure. Generally, in an absorption spectrum of a substance absorbing x-rays, the absorption coefficient rises rapidly at wavelengths intrinsic to the elements contained in the substance, and tails off with decreasing wavelength. That is, a group of wedge-shaped absorption bands if formed. The wavelengths at which the absorption coefficient rises are called absorption edges. When such an x-ray absorption spectrum is taken with high resolution, relatively sharp waves are observed near the absorption edges within a range of tens of eV in terms of photon energy. This structure is called x-ray absorption near-edge structure (XANES) and reflects the atomic valences of the atoms absorbing x-rays and the chemical coupling between them. The absorption coefficient slightly varies like ripples at higher energies over a broad range of 100 to 1000 eV. This structure is known as extended x-ray absorption fine structure (EXAFS). Various kinds of information including the distances to neighboring atoms and coordination numbers can be obtained by analyzing the fine structure.

BRIEF DESCRIPTION OF THE DRAWING

The FIGURE is a graph showing the radial distribution function of a commercially available $M_oS_2$ reagent around $M_o$ contained in it.

DETAILED DESCRIPTION OF THE INVENTION

A catalyst according to the invention comprises a carrier having pores in which a precursor of a sulfide is formed. When the precursor is kept dry, the coordination number of the closest Group VI metal which is found from the radial distribution function around the Group VI metal obtained by the Fourier transform of the EXAFS. Even if the precursor is activated within the flow of hydrogen, the number is maintained less than 0.25. For the conventional catalyst, it is impregnated with an active metal and then preliminarily baked to oxidize the active metal contained in the catalyst. Before the use of the catalyst, the active metal is presulfided. In this case, the coordination number is about 1.5.

The coordination number of the novel catalyst gradually increases with use and eventually makes little difference with the coordination number of the conventional catalyst. However, the novel catalyst is much superior in activity to the conventional catalyst, for the following reason.

For the conventional catalyst, the active metal particles within the pores aggregate by the preliminary baking. What are sulfurized by the presulfiding are only these particles. On the other hand, for the novel catalyst, the precursor of the sulfide is formed in all the pores and gradually crystallizes with use, but aggregation is less likely to occur. Therefore, the larger specific surface is maintained. Hence, the high activity is maintained. This can also be seen from the pore distribution within the catalyst. For the conventional catalyst, it hardly differs from the carrier in pore distribution. The active metal particles aggregate in the pores and are sporadically distributed. For the novel catalyst, the peaks are shifted toward smaller diameters as compared with the distribution of the pores in the carrier. This shows that substances of smaller diameters exist in large quantities within pores.

PRINCIPLE OF ANALYSIS UTILIZING EXAFS

The principle of local structure analysis utilizing EXAFS (extended x-ray absorption fine structure) is described in Analysis, Japan, 1981, 4, pp. 221-228, and explained below. X-rays are absorbed by the photoelectric effect when an inner-shell electron such as K electron is excited to an unoccupied state. The excited electron waves are scattered by the surrounding atoms. A part of the waves returns to the original atom. The excited and outgoing waves interfere with the returning waves. The amount of transition of excited electrons changes according to the energy of the excited electrons, whereby the absorption spectrum has fine structure.

The absorption coefficient $\mu$ is given by $$\mu = \frac{1}{d} \ln \frac{I_0}{I} \tag{1}$$

where $I_o$ is the intensity of the incident x-rays, d is the thickness of the sample, and I is the intensity of the transmitted x-rays. The absorption coefficient $\mu$ holds for all the atoms constituting the substance. The absorption coefficient $\mu_k$ of the K electrons of the atom of interest is given by $$\mu_k = \mu - \mu_B \tag{2}$$

where $\mu_B$ is the absorption coefficient of the other electrons. The coefficient $\mu_k$ includes K absorption component of a free atom model not having fine structure, and this component is given by $\mu_o$. The vibration component X of EXAFS is given by $$X(k) = \frac{\mu_k - \mu_0}{\mu_0} \tag{3}$$

For K electrons, X (k) is theoretically given by $$X(k) = \sum_j \frac{N_j}{kR_j^2} |f_j(\pi)| \sin(2kR_j + \psi_j + 2\delta_1') \times \exp(-\gamma R_j) \exp(-2k^2\sigma_j^2) \tag{4}$$

where k ($=2\pi/\lambda$; $\lambda$ is a wavelength) is the wave number of photoelectrons, R is the distance between the absorbing atoms and the scattering atoms, $2\delta_1'$ is the phase change in the electron waves entering and leaving the absorbing atoms, $|f_j(\pi)|$ is the amplitude of backscattering due to the j-th atom, $\exp(-\gamma R_j)$ is a correction term for correcting for the attenuation of electron waves, $\exp(-2k^2\sigma_j^2)$ is a correction term depending on the fluctuation $\sigma_j$ of the positions of the scattering atoms relative to the absorbing atoms, $N_j$ is the number of atoms existing within the range of $R_j$ from the atoms absorbing x-rays, and $\psi_j$ is the phase shift of waves due to the scattering atoms.

Multiplying both sides of equation (4) with $k|f_j(\pi)|^{-1}$ to express equation (4) in r space and taking the Fourier transform result in $$\bar{X}(r) = \frac{1}{2} \sum_j \frac{N_j}{\sigma_j R_j^2} \exp(-\gamma R_j) \exp\left(-\frac{(r-R)^2}{2\sigma_j^2}\right) + \Delta(r) \quad (5)$$

This quantity has a peak at the position $R_j$ of the j atoms around the absorbing atoms. That is, the radial distribution is found. In the above equation, $\Delta(r)$ indicates the error.

The figure shows the radial distribution function of a commercially available $M_oS_2$ reagent around $M_o$. The function was found according to the above equation. The distance R (in Å) from the $M_o$ atom is plotted on the horizontal axis, while the intensity h of the absorption is plotted against the vertical axis. The coordination number M can be calculated from the positions (R) of the drawn peaks and the intensities (h). Thus, $$M = h \times (R + \Delta R)^2 \times B$$

where $\Delta R$ is the difference between each peak position and a reference peak position, and B is a correction value obtained by measurement of a reference substance.

Examination of the crystalline structure of $M_oS_2$ reveals that the coordination number of $M_o$-S and $M_o$-$M_o$ is 6. Using $M_oS_2$ as a reference sample, the behavior of $M_o$ which is contained in the novel catalyst and a metal belonging to the Group VI can be known.

EXAMPLE

Manufacture of Catalysts

Catalyst A: First, 80 ml of impregnant was prepared from 29.0 g of molybdenum trioxide, 10.5 g of nickel carbonate (containing 43.3% by weight of nickel), 16.5 g of 85% phosphoric acid, and water. Then, 100 g of a carrier molded out of γ-alumina was impregnated with the impregnant. The specific surface of the carrier was 280 m²/g, and the pore volume was 0.75 ml/g. The impregnated carrier was dried at 100° C. for 16 hours. Thereafter, it was baked at 500° C. for 2 hours to give rise to a catalyst consisting of 20% by weight of $M_oO_3$, 4% by weight of $N_iO$, 7% by weight of $P_2O_5$, and alumina. Then, 20 g of this catalyst was impregnated with all of 10 ml of water solution of thioglycolic acid (HSCH$_2$COOH). The solution contained 7.5 g of thioglycolic acid. Thereafter, the catalyst was dried at 100° C. for 16 hours to produce catalyst A.

Catalyst B: First, 100 g of a carrier of γ-alumina was prepared in the same way as in the above process and impregnated with impregnant of the same constitution as the aforementioned impregnant. The carrier was dried at 100° C. for 16 hours. The dried carrier was impregnated with all of 10 ml of water solution of thioglycolic acid. The solution contained 7.5 g of thioglycolic acid. Then, the impregnated carrier was dried at 100° C. for 16 hours to obtain catalyst B.

Catalyst C: A reaction tube made of stainless steel and having a fixed bed was prepared, and 3 ml of catalyst B was loaded into the tube. Then, the catalyst was activated under the conditions:

| | |
|---|---|
| amount of catalyst | 3 ml |
| pressure | atmospheric pressure |
| flow rate of hydrogen | 48 Nl/hr |
| time | 3 hours |
| temperature | 200° C. |

EVALUATION OF ACTIVITY

Using the aforementioned catalysts A, B, and C, Kuwait light oil of normal pressure was hydrotreated and desulfurized. The characteristics of the used light oil of normal pressure were as follows:

| | |
|---|---|
| specific gravity (15/4° C.) | 0.848 |
| sulfur | 1.61% by weight |
| nitrogen | 157 ppm by weight |
| distillation property (initial boiling point) | 211° C. |
| distillation property (50 vol % point) | 340° C. |
| distillation property (end point) | 406° C. |

For the reaction, a reactor through which fluid flowed was employed. The conditions were as follows:

| | |
|---|---|
| amount of catalyst | 3 ml |
| liquid space velocity of feedstock oil | 2.0 hr$^{-1}$ |
| reaction pressure (hydrogen pressure) | 30 Kg/cm² |
| reaction temperature | 330° C. |
| ratio of hydrogen to oil | 300 Nl/l |
| time for which oil is passed | 8 hours |

The processed oil was sampled after 4 hours, after 6 hours, and after 8 hours. The amount of sulfur contained was measured, and the desulfurization ratio was calculated. The results are listed in Table 1.

TABLE 1

| catalyst | coordination number of S | coordination number of $M_o$ | desulfurization ratio (%) | remark |
|---|---|---|---|---|
| A (before) | 0.84 | | 89.6 | comparative example |
| (after) | 3.98 | 2.08 | | |
| B (before) | 0.70 | 0.00 | 95.9 | example of invention |
| (after) | 3.55 | 1.98 | | |
| C (before) | 1.45 | 0.16 | 95.0 | example of invention |
| (after) | 3.82 | 1.86 | | |

INVESTIGATION OF EXAFS

EXAFS of the catalyst A, B, C not used for activity evaluation and of the catalysts used for 360 hours was investigated by the EXAFS experimental facility of the High Energy Physics Laboratory, Japan. The measured absorption coefficients were subjected to Fourier transformation to find the radial distribution function around Mo. Also, the average coordination numbers of Mo-S and Mo-Mo were found. The coordination number of S around Mo, the coordination number of Mo around Mo, and activity are listed in Table 1.

It can be seen from Table 1 that the desulfurization ratio of the catalyst A is somewhat low, because it contains a sulfurizing agent after an active metal is once oxidized, and that the desulfurization ratios of the catalysts are quite high, because water-soluble compounds of active metals are contained in the pores together with sulfurizing agents.

The present invention offers a catalyst which hydrotreats highly active hydrocarbons without the need to presulfide them in a reactor.

What is claimed is:

1. A catalyst for hydrotreating hydrocarbons which comprises:

an inorganic oxide carrier which has pores in which a precursor of a sulfide is formed, a sulfurizing agent impregnated in said carrier, said sulfurizing agent being at least one compound selected from the group consisting of mercaptocarboxylic acid, salts of mercaptocarboxylic acid, bivalent mercaptan, amino-replaced mercaptan, thio acid, and mercaptocarboxylic acid esters, and a water-soluble compound of two metals impregnated in said carrier, a first of said two metals belonging to Group VI of the Periodic Table and a second of said two metals belonging to Group VIII of the Periodic Table, the coordination number of the closest Group VI metal atom that is found from the radial distribution function around a Group VI metal atom of said catalyst, calculated by Fourier transform of the extended X-ray absorption fine structure of the precursor and induced by the relation of said Group VI metal with said closest Group VI metal, being less than 0.25 before use.

2. The catalyst of claim 1, wherein said water-soluble compound further includes phosphorus.

3. The catalyst of claim 2, wherein said phosphorus is present as $P_2O_5$ and is present in an amount up to 80% by weight of the water-soluble compound.

4. The catalyst of claim 1, wherein the metal belonging to Group VI of the Periodic Table is at least one of $M_o$ and W, and wherein the metal belonging to Group VIII is at least one of $C_o$ and $N_i$.

5. The catalyst of claim 1, wherein the amount of sulfurizing agent is one to three times the amount of sulfur in equivalent weight, the sulfur being necessary to form a highly active sulfide when the water-soluble compound catalyst is used in a hydrocarbon hydrotreating process.

6. The catalyst of claim 1, wherein said carrier of an inorganic oxide consists of alumina, silica alumina, or titania.

* * * * *